United States Patent [19]

Odaka

[11] Patent Number: 4,926,979
[45] Date of Patent: May 22, 1990

[54] DISK BRAKE OF A PIN TYPE

[75] Inventor: Seiya Odaka, Saitama, Japan

[73] Assignee: Akebono Brake Industry Co., Ltd., Tokyo, Japan

[21] Appl. No.: 363,689

[22] Filed: Jun. 9, 1989

[30] Foreign Application Priority Data

Jul. 13, 1988 [JP] Japan .................. 63-91840[U]

[51] Int. Cl.⁵ .......................................... F16D 65/00
[52] U.S. Cl. .............................. 188/73.44; 74/18.2; 277/212 FB
[58] Field of Search .............. 188/73.44, 73.45, 71.1; 74/18.2; 277/212 FB

[56] References Cited

U.S. PATENT DOCUMENTS

| 4,235,313 | 11/1980 | Hirashita | 188/73.44 |
| 4,334,598 | 6/1982 | Portolese | 188/73.44 |
| 4,469,337 | 9/1984 | Yokoi et al. | 188/73.44 X |
| 4,530,506 | 7/1985 | Weiler et al. | 188/73.44 X |
| 4,557,354 | 12/1985 | Sakakibara | 188/73.45 |
| 4,678,064 | 7/1987 | Adachi et al. | 188/73.45 |
| 4,688,661 | 8/1987 | Gockel et al. | 74/18.2 X |
| 4,753,326 | 6/1988 | Weiler et al. | 188/73.44 |
| 4,754,854 | 7/1988 | Adachi et al. | 188/73.44 |
| 4,781,273 | 11/1988 | Fujinami | 188/73.45 X |
| 4,807,725 | 2/1989 | Weiler et al. | 188/73.44 X |
| 4,832,161 | 5/1989 | Weiler et al. | 74/18.2 X |

FOREIGN PATENT DOCUMENTS

| 0076227 | 1/1980 | Japan | 188/73.44 |
| 0086238 | 7/1981 | Japan | 188/73.44 |
| 2041121 | 9/1980 | United Kingdom | 188/73.44 |
| 2142395 | 1/1985 | United Kingdom | 188/73.45 |

Primary Examiner—Douglas C. Butler
Attorney, Agent, or Firm—Sughrue, Mion, Zinn, Macpeak & Seas

[57] ABSTRACT

A disc brake of a guide pin type which comprises a boss member provided on one of a caliper of the disc brake and a support member fixed to a stationary portion of a vehicle, a guide pin slidably mounted in the boss member, the guide pin being fixed to the other one of the caliper and the support member, and a boot for damping and sealing the boss member. The boot is disposed between the boss member and the guide pin, the boot is formed of an elastic material, the boot is provided at one end thereof with a thickened portion and a seal portion. The thickened portion has an outer diameter substantially equal to an inner diameter of one end of the boss member, and the thickened portion being press-fitted in between the boss member and the guide pin. The seal portion is substantially tubular, the seal portion is formed integral with the boot, the seal portion is disposed radially outwardly of the thickened portion in surrounding relation to the thickened portion, and the seal portion is fitted on the outer surface of the boss member.

3 Claims, 3 Drawing Sheets 4,926,979

DISK BRAKE OF A PIN TYPE

FIELD OF THE INVENTION

The present invention relates to a disc brake of a pin type, and more particularly to a disc brake incorporating a boot for enclosing a guide pin which slidably guides a caliper of the disc brake in the axial direction thereof.

BACKGROUND OF THE INVENTION

A conventional boot of this type as shown in FIG. 1 is known (hereinafter referred to as "prior art A"). More specifically, a tubular elastic body 4, formed integrally with one end of a boot 3 and having one closed end, is received in a holder member 2. One end portion of the guide pin 1 is received in the elastic body 4, and the guide pin 1 is disposed in sliding contact with the elastic body 4 over the entire circumference of the guide pin 1, so that the guide pin 1 is borne or supported by the holder member 2 through the elastic body 4. With this arrangement, the boot 3 serves to damp the end portion of the guide pin 1 and also to seal this end portion.

Another conventional boot as shown in FIG. 2 is also known (hereinafter referred to as "prior art B"). A bearing member 5 for supporting a guide pin 1 is fitted in an annular groove 16 formed in an inner peripheral surface of a holder member 2. The bearing member 5 is disposed separately from the boot 3. A ring-shaped flange 6 is fitted in an annular groove 17 formed in the outer peripheral surface of one end of the holder member 2.

There is known a further conventional boot as shown in FIG. 3 and disclosed in Japanese Laid-Open (Kokai) Patent Application No. 35861/76 (hereinafter referred to as "prior art C"). A flange 8 of the boot 3 made of an elastic material is fitted in an annular groove 7 formed in an inner peripheral surface of an end of a boss of a caliper 10. The flange 8 fits on a guide pin 1, and the guide pin 1 is received in the caliper 10 acting as a holder member for the guide pin 1. That portion of the flange 8 disposed in sliding contact with the guide pin 1 serves as a bearing portion so as to perform a damping function. The outer peripheral portion of the flange 8 fitted in the annular groove 7 in the boss 2 is compressed between the bottom of the groove 7 and the outer periphery of the guide pin 1 to thereby provide a seal. Thus, the flange performs both the damping function and the sealing function.

FIG. 5 shows a disc brake incorporating a conventional boot 3 formed of an elastic material secured to a boss of the support member 18 and the guide pin 1 fixedly secured to the caliper 10 and a brake disc 17.

In the prior art A shown in FIG. 1, however, the guide pin 1 is mounted in the holder member 2 in such a manner that the end portion of the guide pin 1 is disposed in sliding contact with the elastic body 4 over the entire circumference of the guide pin 1. Therefore, this mounting operation cannot be carried out easily. With respect to the prior art B, since the bearing member 5 for performing the damping function is disposed separately from the flange 6 of the boot 3, the mounting operation of these members as well as the mounting operation of the guide pin 1 in the holder member 2 cannot be carried out easily. As regards the prior art C, the flange 8 of the boot 3 is fitted in the annular groove 7 in the inner peripheral surface of the end of the boss 2 of the caliper 10 (which caliper acts as the holder member and receives the guide pin 1 therein), so that the flange 8 can perform both the damping function and the sealing function. However, such is not proper. Particularly when the outer peripheral portion of the flange 8 formed of an elastic material fitted in the annular groove 7 is compressed by the bottom of the groove 7 as shown in FIG. 4, the outer peripheral surface of the flange 8 is not disposed in intimate contact with the bottom of the groove 7, thus failing to provide a satisfactory sealability.

SUMMARY OF THE INVENTION

With the above deficiencies of the prior arts in view, it is an object of the present invention to provide a boot for a guide pin which boot is simple in construction, less costly, performs excellent damping and sealing functions, and is reliable in operation.

The above and other objects have been achieved by a provision of a disc brake of a pin type having a boot which, according to the invention, comprises a boss member provided on one of a caliper of the disc brake and a support member fixed to a stationary portion of a vehicle, a guide pin slidably mounted in the boss member, the guide pin being fixed to the other one of the caliper and the support member, and a boot for damping and sealing the boss member. The boot is disposed between the boss member and the guide pin, the boot is formed of an elastic material, the boot is provided at one end thereof with a thickened portion and a seal portion. The thickened portion has an outer diameter substantially equal to an inner diameter of one end of the boss member, and the thickened portion being press-fitted in between the boss member and the guide pin. The seal portion is substantially tubular, the seal portion is formed integral with the boot, the seal portion is disposed radially outwardly of the thickened portion in surrounding relation to the thickened portion, and the seal portion is fitted on the outer surface of the boss member.

With the above construction, through a bearing portion, defined by the thickened portion (with which the guide pin is disposed in sliding contact) formed at the end of the guide pin boot, the guide pin fixedly mounted on one of the support member and the caliper is borne or supported by the holder member (boss) formed on the other of the support member and the caliper, and is damped. The generally tubular seal portion formed integrally with the boot is sealably fitted on the outer periphery of the holder member, so that improved damping and sealing effects can be provided on the guide pin and the holder member. Since the outer diameter of the bearing portion is substantially equal to the inner diameter of the holder member (boss), the mounting of the guide pin boot on the guide pin and the holder member can be carried out easily.

PREFERRED EMBODIMENTS OF THE INVENTION

Preferred embodiments of the invention will now be described with reference to accompanying drawings.

Figure 7:
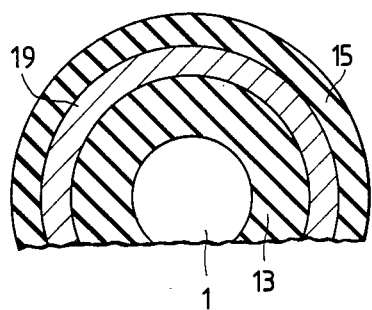
FIG. 7 is a cross-sectional view taken along the line VII—VII of FIG. 6.
Figure 6:
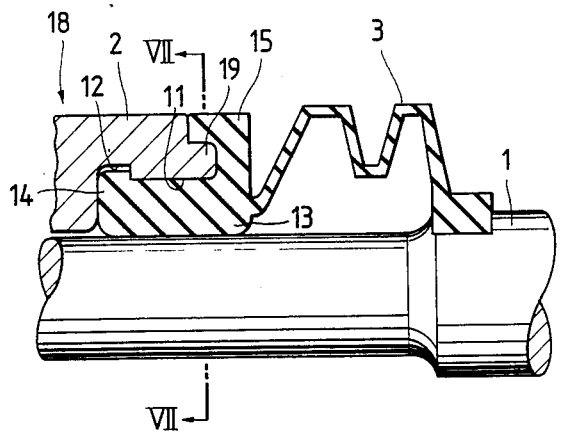
FIG. 6 is a fragmentary, vertical cross-sectional view of a disc brake incorporating a first preferred embodiment of a guide pin boot of the invention.

FIGS. 6 and 7 show a first embodiment of the invention in which a mounting arrangement of the boot 3 is improved. An annular recess 11 is formed in the inner peripheral surface of one end of the boss 2 of the support member 18, and a retainer groove 12 is provided at the inner end of the recess 11. A boot 3 made of an elastic material has at one end thereof a thickened portion 13 having an outer diameter substantially equal to the inner diameter of the annular recess 11, and a projection 14 slightly greater in diameter than the thickened portion 13.

A guide pin 1 is disposed in sliding contact with the thickened portion 13. The thickened portion 13 is fitted in the annular recess 11 and acts as a bearing portion for supporting the guide pin 1. The projection 14 is fitted in the retainer groove 12 to prevent the one end of the boot 3 from being disengaged from the boss 2 in the axial direction of the boot 3. The boot 3 also has an annular seal portion 15 which is disposed radially outwardly of the thickened portion 13 and surrounds part of the thickened portion 13. The inner diameter of the seal portion 15 is slightly smaller than the outer diameter of an end 19 of the boss 2, the end 19 being fitted in the seal portion 15. With this arrangement, the seal portion 15 is disposed in intimate contact with the end 19 of the boss 2.

Figure 8:
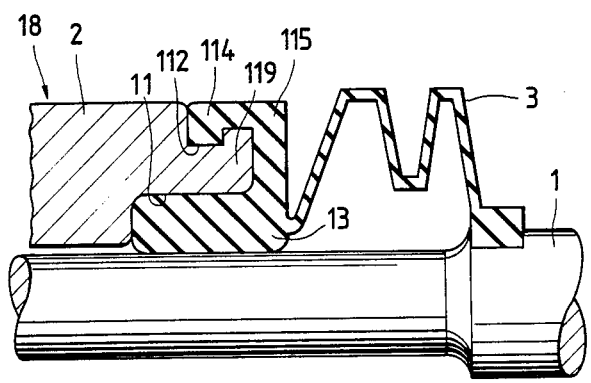
FIG. 8 is a fragmentary, vertical cross-sectional view of a disc brake incorporating a second preferred embodiment of a guide pin boot of the invention.

FIG. 8 shows a second embodiment of the invention. In this embodiment, a projection 114 for preventing the axial disengagement of the end of a boot 3 is not provided on the end of a thickened portion 113 (with which a guide pin 1 is disposed in sliding contact) as in the above first embodiment, but is provided on an end of an annular seal portion 15. The second embodiment will now be described in further detail. An end 119 of a boss 2 of a support member 18 has an annular recess 11 formed in an inner peripheral surface thereof. The boot 3 made of an elastic material has at one end thereof the thickened portion 113 having an outer diameter substantially equal to the inner diameter of the annular recess 11, the guide pin 1 being disposed in sliding contact with the thickened portion 13. The thickened portion 13 is fitted in the annular recess 11 and serves as a bearing portion for supporting the guide pin 1. The boot 3 also has an annular seal portion 115 which is disposed radially outwardly of the thickened portion 13 and surrounds part of the thickened portion 13. The inner diameter of the seal portion 115 is slightly smaller than the outer diameter of the end 119 of the boss 2 of the support member 18, the end 119 being fitted in the seal portion 115. With this arrangement, the seal portion 115 is disposed in intimate contact with the end 119 of the boss 2. The projection 114 is formed on the inner peripheral surface of the end of the annular seal portion 15, and is fitted in a retainer groove 112 formed in the outer peripheral surface of the boss 2, thereby preventing the one end of the boot from being axially disengaged from the boss 2.

In the above first and second embodiments, although the boss 2 of the support member 18 serves as a holder member for the guide pin 1, the embodiments are not limited to such a construction. For example, the invention may also be applied to a disc brake of another type in which the guide pin is secured to the support member 18. In this case, a member for slidably supporting the guide pin 1, that is, a boss 2 of the caliper 10, serves as such a holder member.

With the above construction of the invention, when the thickened portion 13 (bearing portion) for sliding contact with the guide pin 1 is press-fitted in between the guide pin 1 and the annular recess 11 of the boss 2 (holder member) of either the support member 18 or the caliper 10, the bearing portion, having the outer diameter substantially equal to the inner diameter of the annular recess 11, performs only the damping function and does not perform the sealing function.

Figure 1:
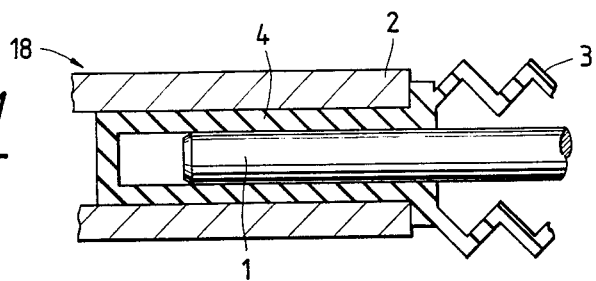
FIG. 1 is fragmentary, vertical cross-sectional views of a conventional disc brake incorporating guide pin boots of the prior art A.
Figure 2:
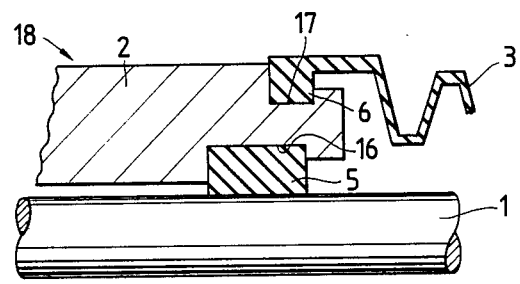
FIG. 2 is fragmentary, vertical cross-sectional views of a conventional disc brake incorporating guide pin boots of the prior art B.
Figure 3:
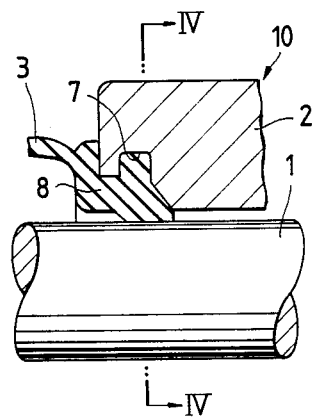
FIG. 3 is fragmentary, vertical cross-sectional views of a conventional disc brake incorporating guide pin boots of the prior art C.
Figure 4:
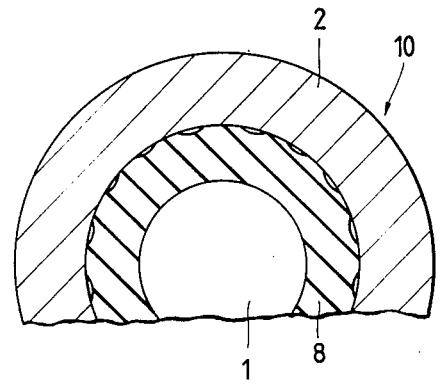
FIG. 4 is a cross-sectional view taken along the line IV—IV of FIG. 3.
Figure 5:
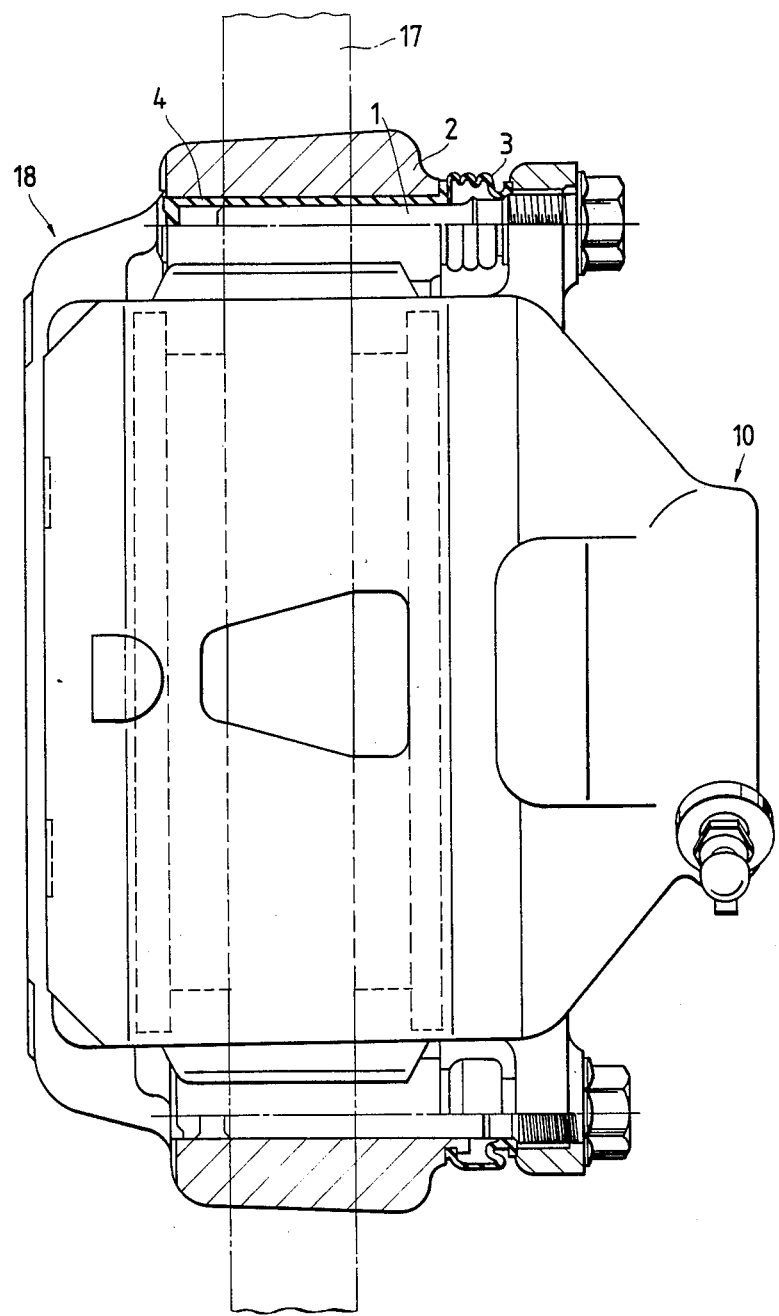
FIG. 5 is a partly cross-sectional, front-elevational view of a disc brake incorporating a conventional boot for a guide pin.

Thus, this bearing portion does not have a ring-shaped flange (projection) performing both the damping and sealing functions, such as the ring-shaped flange 8 of the above prior art C shown in FIG. 3. Therefore, the mounting operation of the boot 3 can be carried out easily. In the first embodiment (FIGS. 6 and 7), although the thickened portion 13 with which the guide pin 1 is disposed in sliding contact has the projection 14 for preventing the axial disengagement of the end of the boot 3 from the boss 2, the above mounting operation is not affected by the projection 14, since the projection 14 is designed merely to prevent such axial disengagement and therefore is not required to have a so much increased outer diameter.

Further, the thickened portion 13 extends outwardly beyond the end 19 of the boss 2 (the end of the holder member for the guide pin 1), and therefore the guide pin 1 is prevented from coming into metal-to-metal contact with the edge of the end of the holder member, and an excellent damping effect can be achieved.

Furthermore, while the guide pin 1 is not received in the holder member, the thickened portion 13 can be axially removed therefrom because of its elastic nature.

Moreover, the annular seal portion 15, which disposed radially outwardly of the thickened portion 13 and surrounds the same, has the inner diameter slightly smaller than the outer diameter of the end 19 of the boss 2 (holder member ) of either the support member 18 and the caliper 10. Therefore, the annular seal portion 15 is snugly fitted on the end 19 and is held in intimate sealing contact with the outer periphery of the holder member to thereby positively preventing an intrusion of water between them, so that the sliding contact portion of the guide pin 1 is free from rust. Further, the thickened portion 13, serving as the bearing portion, and the seal portion 15 are formed integrally with the boot 3. Therefore the number of the component parts is reduced, and the mounting operation of the boot 3 can be undertaken easily, and the boot having both the excellent damping and sealing effects can be provided.

What is claimed is:

1. A disc brake of a pin type, comprising:

a boss member provided on one of a caliper of the disc brake and a support member fixed to a stationary portion of a vehicle;

a guide pin slidably mounted in said boss member, said guide pin being fixed to the other one of said caliper and said support member; and means for damping and sealing said boss member, said means being disposed between said boss member and said guide pin, said means being formed of an elastic material, said damping and sealing means being provided at one end thereof with a thickened portion and a seal portion, said thickened portion having an outer diameter substantially equal to an inner diameter of one end of said boss member, said thickened portion being press-fitted in between said boss member and said guide pin, said seal portion being substantially tubular and formed integral with said damping and sealing means, said seal portion being disposed radially outwardly of said thickened portion in surrounding relation to said thickened portion, said seal portion being fitted on said outer surface of said boss member.

2. The disc brake of claim 1, wherein said thickened portion is provided on an outer surface thereof a projection for preventing said damping and sealing means from being axially disengaged from said boss member, said projection being engaged with a retainer portion provided on an inner surface of said boss member.

3. The disc brake of claim 1, wherein said seal portion is provided on an inner surface thereof with a projection for preventing said damping and sealing means from being axially disengaged from said boss member, said projection being engaged with a retainer portion provided on an outer surface of said boss member.

* * * * *